July 27, 1954

J. E. LILIENFELD 2,685,053

ELECTROLYTIC CAPACITOR SYSTEM

Filed June 3, 1950

INVENTOR.
JULIUS EDGAR LILIENFELD
BY
Emery, Holcombe & Blair
ATTORNEYS.

July 27, 1954   J. E. LILIENFELD   2,685,053
ELECTROLYTIC CAPACITOR SYSTEM
Filed June 3, 1950   3 Sheets-Sheet 2

INVENTOR.
JULIUS EDGAR LILIENFELD
BY
Emery, Holcombe & Blair
ATTORNEYS.

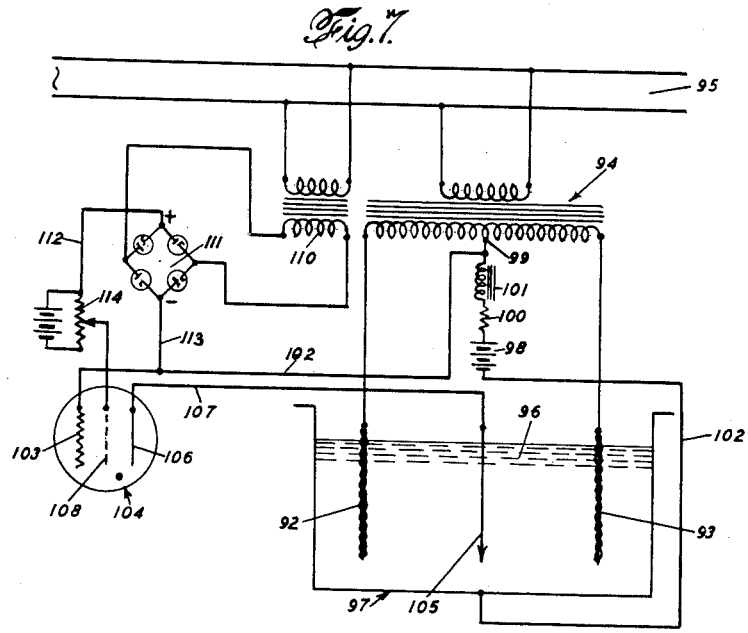
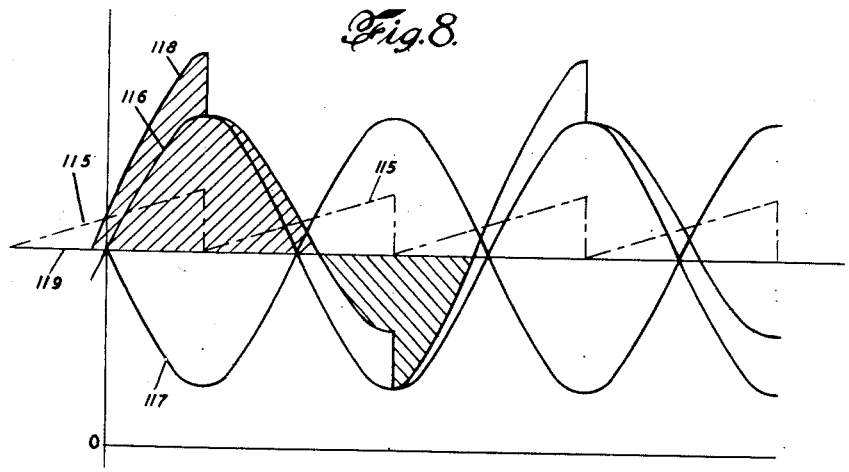

Patented July 27, 1954

2,685,053

UNITED STATES PATENT OFFICE 2,685,053

ELECTROLYTIC CAPACITOR SYSTEM

Julius Edgar Lilienfeld, St. Thomas, V. I., assignor to Samuel D. Warren, Essex, and Ralph F. Burkard, Arlington, Mass., jointly Application June 3, 1950, Serial No. 165,997

11 Claims. (Cl. 317—231)

In the art of producing and applying to various purposes dielectric films on aluminum, it was proposed to use such films as the dielectric in the construction of capacitors. However, in making use of these capacitors on oscillating voltages (A. C. networks) it was realized that—inasmuch as the films are of an anodic character and, consequently, the aluminum electrode acts as a rectifier upon the reversal of its polarity—some provision had to be made to avoid the breakdown of the film which occurs when the electrode becomes negative with respect to the electrolyte, and the film thus loses its dielectric property. Means to cope with this problem, which appear as theoretically sound, are indicated in the U. S. Patent to Moscicki No. 926,128. However, it developed that a progressive deterioration of the film occurs when capacitors of this nature are placed in operation in A. C. networks, even though such means are applied. Moscicki-type capacitors did not therefore find a place in commercial use.

Failure to comprehend the physicochemical nature of the deterioration of the dielectric film on aluminum explains the lack of success of prior attempts.

The present invention has its basis in the conception that, while a capacitor constructed according to the Moscicki disclosure provides for a definite potential difference between the aluminum metal and the electrolyte which is a purely electrostatic feature, the disclosure ignores the electrochemical processes occurring at the outer face of the dielectric film. In fact, one of the essential features of Moscicki's capacitor design is the purely electrostatic expedient of operating two identical filmed electrodes respectively connected in series to opposite terminals in an A. C. network. The aforesaid inherent property of dielectric films of breaking down is thereby, in a measure, counteracted inasmuch as the negative phase of the A. C. input at one terminal cannot break down the film at the corresponding electrode unless the film on the other electrode breaks down simultaneously; and the probability of such latter breakdown is comparatively negligible.

When, however, it developed that the twin electrode design does not overcome the progressive deterioration of the dielectric, Moscicki conceived the idea that said action could be prevented by another electrostatic expedient, i. e., by charging or biasing both filmed electrodes positively with respect to the electrolyte. This is equivalent merely to displacing the axis, about which, in A. C. operation, the potentials of the twin electrodes are oscillating with respect to the potential of the electrolyte, from a zero position to a substantially positive one. The latter expedient, being electrostatic, leaves unchanged the oscillation of the potential at either one of the condenser electrodes relative to the electrolyte; and it is only natural that the Moscicki bias actually does not inhibit the progressive deterioration of the film.

It is my conclusion that, regardless of the said axis displacement, the twin electrodes are alternately subjected throughout the condenser operation to the same deteriorating physicochemical process as would be the case if each were operated as a cathode on a unidirectional voltage, and that this operation is responsible for the progressive deterioration of the dielectric film. I conceived that this is so because, in the interval of the cycle in which the filmed electrode potential drops from peak plus (+) to peak minus (—), the outer face of the dielectric film loses negative charges, conveyed by anions, and acquires positive charges which are conveyed by cations. Such is the identical condition under which the film on the active electrode of an aluminum rectifier loses its dielectric property, breaks down and permits the current to flow in the reverse direction.

The deterioration of filmed electrodes can hardly be accounted for by the release of such anions as had been retained during the preceding half cycle—from a peak minus (—) value to a peak plus (+) value—at the outer face of the electric field across the dielectric. Hence it follows that it is the deposition of cations upon the outer face of the dielectric of an electrolytic condenser electrode—occurring when the outer face of the film does not supply the needed anions—which is to be regarded as the primary cause of the dielectric deterioration. Thus, the present invention is concerned with a method of and a means for providing an increase of the number of said conveying anions to reduce the number of cations involved in said process of convection of charges to and from the outer face of the film; and thus to minimize the deleterious effects of the impact of cations being deposited upon said face.

To this end, I call attention to the fact that if an electrolytic condenser is kept charged by a stationary E. M. F. until its leak approaches the obtainable minimum, then discharged partially or wholly, and next, after a time interval, charged again by said E. M. F., an appreciable time interval is needed to reestablish the said minimal leak, which latter interval increases the longer the said discharging and idling process had taken. Thus it appears that appreciable inhibition of electrode film deterioration and an improvement of the performance of both electrodes will follow if a way were found to assign a shorter time interval to the lower (negative) voltages in the cycle and a longer time interval to the recuperative higher (positive) voltages in the cycle. In applying this observation and in accordance with the invention, it is proposed— in contradistinction to the purely electrostatic means employed heretofore—to introduce, by the superimposition of a dynamically varied unidirectional potential, positive with respect to the electrolyte and applied simultaneously to both electrodes, an adequately asymmetrical condition in the operation of said electrodes with respect to the electrolyte potential. The concomitant dynamic feature of this operation is the imparting to the electrolyte of an oscillating negative space charge. In this respect reference is made to my prior pending application Serial No. 74,274, filed February 3, 1949, now Patent No. 2,585,947.

The novel method and means herein set forth comprise the superimposition, over the oscillations of the current in commercial power lines between the twin electrodes, of unidirectional current pulses charging simultaneously both electrodes to a range of potentials positive relative to the electrolyte. The optimal effect to be achieved by the superimposition of said two components may be summed up in terms of a time-voltage function by stating that, the peak voltages remaining equal, the potential of either one of the twin electrodes relative to the electrolyte assumes, within one full period of the A. C. cycle, a set of values such as to make the algebraic value of the integral of said function, taken with respect to any intersecting abscissa as zero axis, as large as practically feasible. Thus, the aforesaid constructive anodic action upon the film is made substantially to compensate for the destructive cathodic action thereon, thereby greatly extending the useful life of the condenser.

The nature of the invention, however, will best be understood when described in connection with the accompanying drawings, in which:

Fig. 7 is a diagrammatic representation with associated control means and electrical connections illustrating a still further form of the electrolytic condenser, more particularly in relation to the control means shown in Fig. 5; and Fig. 8 is a graph illustrating the voltage relationships during operation.

Figure 1:
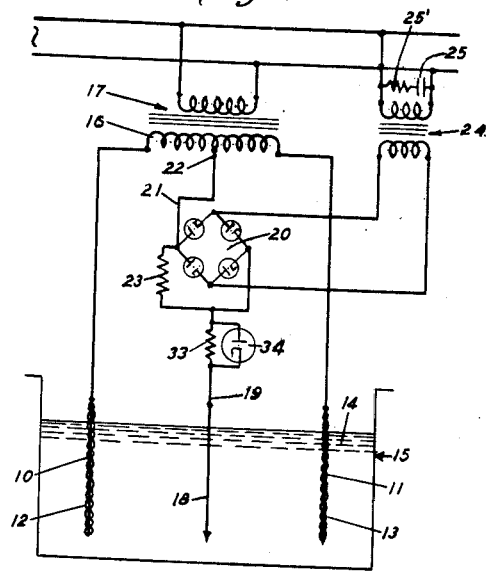
Fig. 1 is a diagrammatic representation of the novel electrolytic condenser with associated control means and electrical connections.

Referring to the drawings, more particularly Fig. 1 thereof, an electrolytic condenser is diagrammatically indicated by the two (twin) electrodes 10 and 11, as of aluminum and each provided over its active surface with a dielectric film 12 and 13, respectively, which active films are in contact with a suitable electrolyte 14, retained in a container 15. The electrodes are respectively connected in series to opposite terminals in an A. C. network as the source of oscillating potential represented by the secondary winding 16 of a transformer 17.

In accordance with the invention, provision is made to superimpose, over the oscillations of the current passing through the electrolyte between the films 12 and 13, unidirectional current pulses as a component to add algebraically to the said oscillating current component thus adding algebraically charges conveyed to the capacitor electrodes. This is effected through the provision of a further and non-filmed electrode 18 also immersed in the electrolyte 14 and between said condenser filmed electrodes 10 and 11. The electrode 18 to this end is connected through a lead 19 to one terminal of a full-wave rectifier 20, the other terminal of said rectifier being connected through a lead 21 to the center tap 22 of transformer secondary 16.

A by-passing bleeder resistor 23 is connected across the rectifier output and obviously acts also as a shunt across the dielectric films of both electrodes 10, 11. The input to the rectifier is connected to the network through the secondary of a further transformer 24, the primary of which is connected to the same network as the transformer 17. Provision for shifting the phase of the rectifier output is afforded by connecting, for example, across the primary or input of transformer 24 a condenser 25 and resistor 25' in series. Thus the unidirectional voltage pulses may be shifted 90° with respect to the network oscillating voltage applied to the condenser electrodes.

Figure 3:
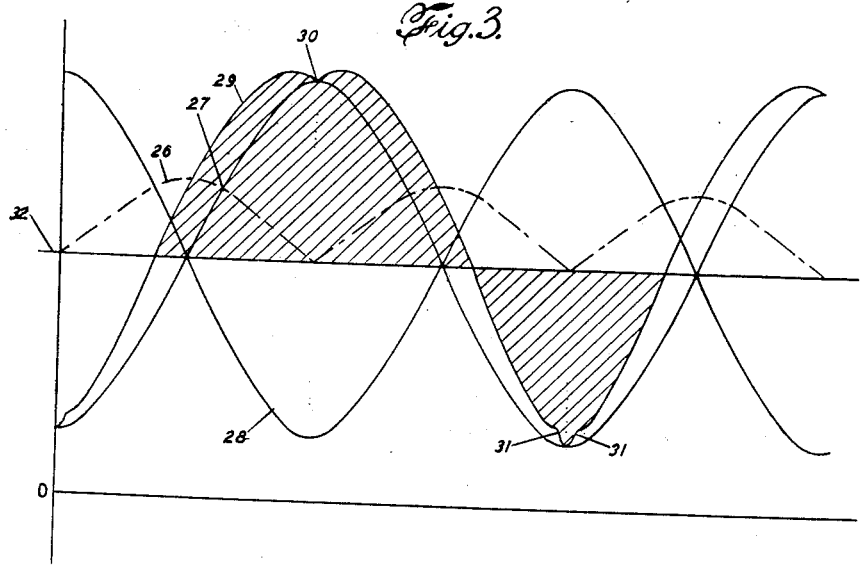
Fig. 3 is a graph of the voltage relationships prevailing during one complete cycle of oscillating potential applied to the twin electrodes of the condenser shown in the foregoing figures, as modified in accordance with the invention. For one of the twin electrodes, however, and for the sake of clearness, the graph showing the potential resulting from the aforesaid superimposition is not shown.

By effecting such shift, the pulsating voltage resulting from the rectification will appear as is indicated in the graph 26, Fig. 3 of the drawings. Such pulsating voltage when algebraically added to the condenser electrode voltage oscillations, as represented by the sinusoids 27 and 28, will provide the resultant potential curve 29, with respect to the electrolyte, for either electrode, said curve having a minute cusp 30 at the maximum voltage of a condenser electrode during the positive phase and similarly insignificant indentations 31 during the negative phase of said applied voltage.

It will be noted that the positive phase of the resultant potential of sinusoid 27 spreads over a longer time interval along the axis 32 at the expense of the time interval of its negative phase, thus becoming asymmetric. It is preferred, also, to include in the lead 19 a resistor 33 in parallel with a rectifier 34 as a means to increase the amplitude of the unidirectional pulses with little expenditure of energy. The energy loss involved in the provision of the bleeder resistor 23 is not significant when compared with the power saving effect of the novel condenser.

By the hereinbefore described provision for shunting the filmed electrodes with respect to the non-filmed electrode, the charges added algebraically to the respective filmed electrodes are substantially discharged therefrom, and these filmed electrodes do not remain charged to the peak of the unidirectional pulses produced by the rectifier but partially discharge in step with the said pulsations their algebraically added charges. This results in an adequately asymmetrical condition indicated by the respective cross-hatched portions—in the operation of said filmed electrodes with respect to the electrolyte potential, while an oscillating space charge is dynamically imparted to the capacitor electrolyte in synchronous relation to the network potential oscillations.

In all intervals of that half of the cycle during which one of the two condenser electrodes assumes a positive potential with respect to the other condenser electrode, the potential of the former relatively to said axis 32 is higher than the potential of the latter. Thus, the film-forming positive potential of either electrode becomes substantially higher during the positive half cycle than during the negative half cycle and the measure of which is indicated by the respective cross-hatched portions. Thus the leak-reducing action at high potentials becomes more prominent than the leak-increasing action occurring by a change to low potential, whereby the destructive action of the operation of electrolytic films on A. C. networks is circumvented or substantially reduced. As hereinbefore noted, a dynamically established pulsating negative space charge is afforded in the electrolyte which opposes the destructive action of the cations.

Figure 2:
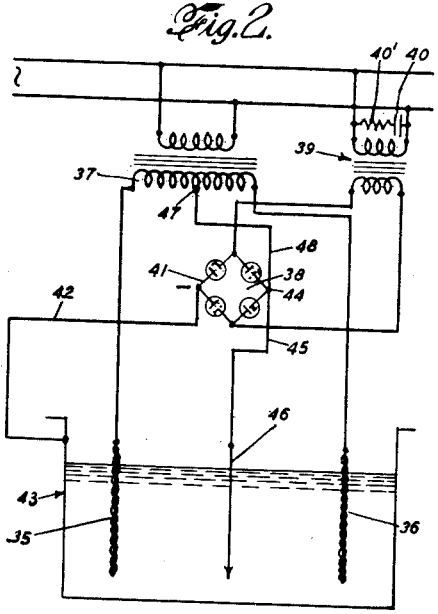
Fig. 2 is a diagrammatic representation with associated control means and electrical connections, similar to Fig. 1, and illustrates a modification.

It is possible to substitute for the bleeder resistor, as is set forth in the hereinbefore-described embodiment, Fig. 1, a path of high resistance in the electrolyte. Reference being had to Fig. 2 of the drawings, the condenser electrodes 35 and 36 are connected as in the said embodiment shown in Fig. 1 to the secondary 37 of a transformer and the rectifier 38 to a further transformer 39, said latter connection including the condenser 40 with series resistor 40' to shift 90° the phase of the potential applied to full-wave rectifier 38 with respect to the potentials applied to the electrodes 35 and 36.

The rectifier 38 in this embodiment, however, has its negative output terminal 41 connected through a lead 42 to the container 43 which is made of electrically conductive material to this end. The other operative output terminal 44 of the rectifier is then connected directly through a lead 45 to a high resistance electrode 46, the surface area of which is small enough to provide a high resistance as of the order of the said bleeder resistor. Said terminal is also connected to the center tap 47 of the secondary winding 37 of the transformer, through lead 48. The electrode 46 may be of the nature more particularly set forth in my copending application Serial No. 74,274, now Patent No. 2,585,947.

Figure 4:
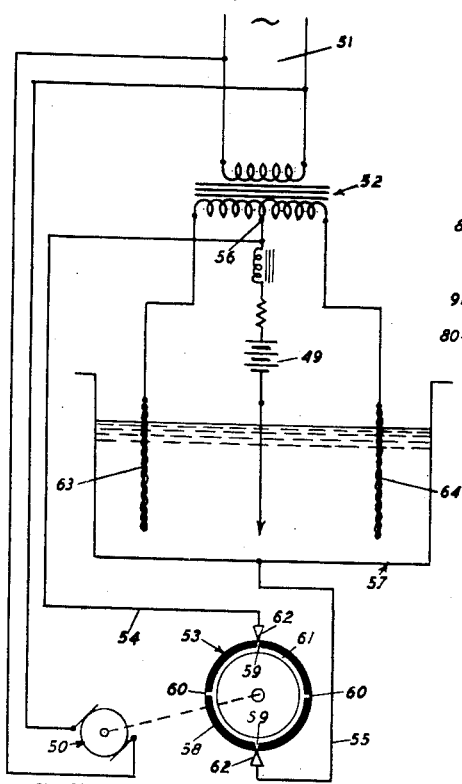
Figs. 4 and 5 are diagrammatic representations with associated control means and electrical connections, illustrating further modifications in the novel electrolytic condenser.

The provision of the unidirectional potential pulses, as from a battery 49, Fig. 4, may be by other means. For example, a synchronous motor 50, powered from the mains 51 supplying power to transformer 52 connected to the condenser, is arranged to drive a rotatable disk-type switching means 53. The latter is connected in series with the leads 54 and 55, the former lead being connected to the center tap 56 and the latter to the container 57 which is of electrically conductive material.

Figure 6:
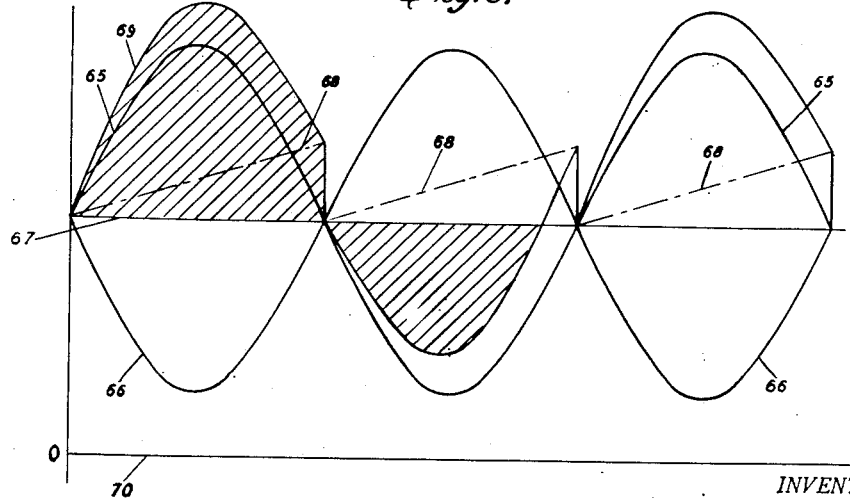
Fig. 6 is a graph, similar to that shown in Fig. 3, of the voltage relationships prevailing during the operation of the condensers shown in Figs. 4 and 5.

The switch means 53 is of the rotary-disk type including an outer annular element 58 of insulating material but interrupted at two pairs of points which are spaced 90° apart, to accommodate pairs of conducting points 59 and 60 which are interconnected permanently as through an inner conducting ring or band 61. A pair of diametrically opposed contact brushes 62 is designed to wipe the periphery of element 58, and the two brushes are connected respectively to the leads 54 and 55. When, in the rotation of the switch means 53, contact is then established between said brushes and the contacting points, the condenser charges which had been added previously will be partially discharged. This, as stated, is made to occur twice in one complete cycle of the applied oscillating condenser potential. This action will be more apparent by reference to Fig. 6 of the drawings, wherein are plotted against time the values over a complete cycle of the oscillating potential components prevailing at the twin filmed electrodes 63, 64, as well as the resultant potentials, as against the electrolyte, prevailing at said twin filmed electrodes and as a result of the algebraically added unidirectional component. The actual added unidirectional voltage component has also been plotted.

Thus, the sinusoid 65 represents the potential of the one electrode 63 of the twin filmed electrodes and the sinusoid 66 the potential of the other twin electrode 64 as against the symmetry axis of oscillation 67 about which the potentials of said eelctrodes are oscillating. The unidirectional component 68 which is imparted simultaneously to both of the electrodes is indicated in the ideal graph as of a sawtooth character synchronized with the half cycles of the sinusoidal oscillations.

The resultant potentials of the electrodes are arrived at by the algebraic summation of the A. C. potentials represented by the sinusoids 65, 66 and the "sawtooth" potentials 68. One of the so-resulting traces is indicated at 69, and represents the oscillation of the twin electrode potentials with respect to said symmetry axis of oscillation 67 which latter is at a potential level positive with respect to the zero axis indicated at 70.

Figure 5:
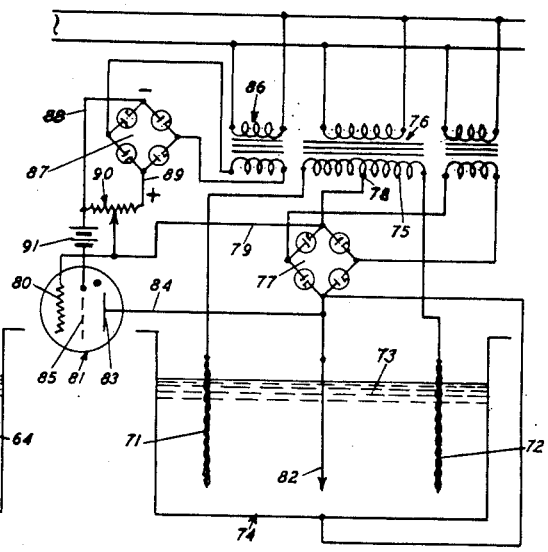

Other means for introducing the said unidirectional pulsating potential component may be utilized, for example, ionized gas discharge means such as embodied in thyratrons. Thus, reference being had to Fig. 5 of the drawings, the twin filmed electrodes 71 and 72, which are immersed in electrolyte 73 of the condenser container 74, are directly connected to the secondary winding 75 of a transformer 76, as in the previously described embodiment of the invention. A source of unidirectional current, such as the full-wave rectifier 77, is connected to the center tap 78 of secondary winding 75 and to the container 74 which is of electrically conducting material. The tap 78 is connected through lead 79 to the thermionic cathode 80 of a thyratron 81, while the non-filmed electrode 82 for introducing the unidirectional current is connected to the anode 83 through lead 84. The grid 85 and cathode 80 are connected to the oscillating voltage source, represented by a transformer 86, through a secondary winding of said transformer, the oscillating current being rectified by a full-wave rectifier 87. The output leads 88 and 89 of this rectifier are connected to a potentiometer 90 supplying the required voltage between said cathode and grid. In this embodiment, the grid has either no D. C. bias component or an insignificantly small one—indicated at 91—as corrective means for the tube characteristic. The 120- cycle pulsating bias component is negative on the grid and so the thyratron fires when the 120-cycle voltage is zero, which is at the nodal point of the 120-cycle pulses, to discharge the condenser electrodes 71, 72 about to the level of the ionization voltage of its gas content.

A modification in timing of the unidirectional pulses as applied in the operation of the novel condenser, for example, by means of a thyratron, is illustrated in Fig. 7 of the drawings. In this embodiment, the twin filmed electrodes 92 and 93 are connected through the secondary of a transformer 94 to a network of oscillating potential represented by the main 95, the said electrodes being immersed in electrolyte 96 of the condenser container 97. A source of unidirectional current, such as the battery 98, is connected to the center tap 99 of the secondary winding of the transformer 94 preferably through a resistor 100 and choke coil 101, the negative side of the battery being connected to the container 97 which is electrically conductive. The tap 99 is then connected through a lead 102 to the thermionic cathode 103 of a thyratron 104, while the non-filmed electrode 105 for introducing the unidirectional current is connected to the anode 106 through a lead 107. The grid 108 and cathode 103 are connected to the oscillating voltage source, represented by the main 95, through a secondary winding 110 of said transformer, the oscillating current being rectified by a full-wave rectifier 111, one of the output leads 112 and 113, as the lead 112, being connected to a potentiometer 114 such as to supply a negative voltage to the grid 108. In this embodiment, it is essential that the said grid be biased negatively and the lead 112 is connected to the rectifier 111 to supply positive potential therethrough to the grid, for the purpose hereinafter more fully set forth. The other output lead 113 of the rectifier is connected to the cathode 103 and to the tap 99, while the anode 106 is connected to the condenser electrode 105. The D. C. bias component applied to the grid 108 is substantial and negative, the 120-cycle pulse component is positive on the grid, and the thyratron fires when the latter component is at the peak of the 120-cycle pulse; and so 90° displaced with respect to the embodiment shown in Fig. 5.

Reference being had to Fig. 8 of the drawings, it will be noted that the added D. C. voltage components 115 are displaced 90° from the respective sinusoids 116 and 117 of the network potentials applied to the condenser electrodes. This will result in the cut-off of the added voltage occurring at the peak positive voltage of a sinusoid. The resultant potential will appear as represented by the graph 118 and such algebraic summation of the potentials applied to the electrodes and the unidirectional pulses will result in the graph 118 being spread out along the axis 119 beyond the normal sinusoid 116, for example, and during the positive phase of the cycle, whereas during the negative phase of the cycle it becomes correspondingly contracted. Thus, the leak-reducing action at high potentials becomes more prominent, also in this embodiment, than the increase at low potentials, whereby the destructive action of the operation of electrolytic films on A. C. networks is circumvented or substantially reduced.

I claim:

1. An electrolytic capacitor system for operation on an oscillating potential network including a source of a. c. electric power, comprising a pair of twin filmed electrodes provided with means for connecting them to a network of the character described, a container for electrolyte, together with a non-filmable electrode in said container constituting a part of said system when said container is supplied with electrolyte; and means incorporated in said system for impressing upon the non-filmable electrode when operating on such a network a unidirectional potential continuously pulsating with one-half the period of said oscillating potential.

2. An electrolytic capacitor system according to claim 1, wherein a full-wave rectifier is provided to impress a unidirectional potential upon the non-filmed electrode, a bleeder resistor is connected across the rectifier output, and the input circuit to the rectifier includes a phase-shifting means.

3. An electrolytic capacitor system according to claim 1, wherein a full-wave rectifier is provided to impress a unidirectional potential upon the non-filmed electrode and the negative output terminal of the rectifier is connected to the electrolyte container and the other and positive terminal thereof is connected to the non-filmed electrode.

4. An electrolytic capacitor system according to claim 1, wherein the non-filmed electrode is of the high-resistance type.

5. An electrolytic capacitor system according to claim 1, wherein shunting means operate in synchronism with respect to the oscillating potential for short-circuiting the filmed electrodes with respect to the non-filmed electrode periodically.

6. An electrolytic capacitor system according to claim 5, wherein the short-circuiting means comprise a synchronous motor operated from the oscillating potential, and a switching means driven thereby and connected to the container and to the non-filmed electrode.

7. An electrolytic capacitor system according to claim 5, wherein the short-circuiting means is a thyratron operated from the network oscillating potential and its cathode being connected to the container and its anode to the non-filmed electrode.

8. An electrolytic capacitor system according to claim 7, wherein a full-wave rectifier is included in circuit with the network oscillating potential, together with a potentiometer, to supply governing voltage to the grid of the thyratron.

9. An electrolytic capacitor system according to claim 8, wherein the grid is negatively biased and the negative terminal of the rectifier is connected to the said grid.

10. An electrolytic capacitor system according to claim 8, wherein the grid is negatively biased and the positive terminal of the rectifier is connected to the said grid.

11. An electrolytic capacitor system according to claim 1, wherein the means for impressing upon the non-filmed electrode a continuously pulsating unidirectional potential includes means for shunting both filmed electrodes with respect to the non-filmed electrode.

References Cited in the file of this patent

UNITED STATES PATENTS

| Number | Name | Date |
| --- | --- | --- |
| 1,077,628 | Mershon | Nov. 4, 1913 |
| 1,716,161 | Allcutt | June 4, 1929 |
| 2,451,341 | Jernstedt | Oct. 12, 1948 |
| 2,515,192 | Chester | July 18, 1950 |